(12) United States Patent
Zhou (10) Patent No.: US 11,704,776 B2
(45) Date of Patent: *Jul. 18, 2023

(54) DEPTH-BASED IMAGE STABILIZATION

(71) Applicant: AMAZON TECHNOLOGIES, INC., Seattle, WA (US)

(72) Inventor: Dong Zhou, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/547,816

(22) Filed: Dec. 10, 2021

(65) Prior Publication Data

US 2022/0103798 A1 Mar. 31, 2022

Related U.S. Application Data

(63) Continuation of application No. 16/595,423, filed on Oct. 7, 2019, now Pat. No. 11,206,384, which is a
(Continued)

(51) Int. Cl.
*H04N 13/128* (2018.01)
*H04N 13/239* (2018.01)
(Continued)

(52) U.S. Cl.
CPC .............. *G06T 5/002* (2013.01); *G06F 18/00* (2023.01); *G06T 5/50* (2013.01); *G06V 20/46* (2022.01);
(Continued)

(58) Field of Classification Search
CPC .............. H04N 13/128; H04N 5/23248; H04N 5/23258; H04N 5/23264; H04N 5/23267;
(Continued)

(56) References Cited

U.S. PATENT DOCUMENTS 4,951,140 A * 8/1990 Ueno ...................... H04N 19/23
375/E7.218
6,037,976 A 3/2000 Wixson
(Continued)

FOREIGN PATENT DOCUMENTS

CN 102088544 B 6/2012
WO WO 2012029615 3/2012

OTHER PUBLICATIONS

Tai et al., "Correction of Spatially Varying Image and Video Motion Blur Using a Hybrid Camera"; (c) IEEE, Jun. 2010; 0162-8828/10 (Year: 2010).

*Primary Examiner* — Dramos Kalapodas
(74) *Attorney, Agent, or Firm* — Pierce Atwood LLP (57) ABSTRACT

Depth information can be used to assist with image processing functionality, such as image stabilization and blur reduction. In at least some embodiments, depth information obtained from stereo imaging or distance sensing, for example, can be used to determine a foreground object and background object(s) for an image or frame of video. The foreground object then can be located in later frames of video or subsequent images. Small offsets of the foreground object can be determined, and the offset accounted for by adjusting the subsequent frames or images. Such an approach provides image stabilization for at least a foreground object, while providing simplified processing and reduce power consumption. Similarly processes can be used to reduce blur for an identified foreground object in a series of images, where the blur of the identified object is analyzed.

20 Claims, 9 Drawing Sheets

Related U.S. Application Data continuation of application No. 15/396,790, filed on Jan. 2, 2017, now Pat. No. 10,440,347, which is a continuation of application No. 13/829,614, filed on Mar. 14, 2013, now Pat. No. 9,538,081.

(51) Int. Cl.

| | | |
|---|---|---|
| *G06T 5/00* | (2006.01) | |
| *G06T 5/50* | (2006.01) | |
| *G06V 20/40* | (2022.01) | |
| *G06V 20/64* | (2022.01) | |
| *G06F 18/00* | (2023.01) | |
| *H04N 23/68* | (2023.01) | |
| *H04N 13/25* | (2018.01) | |
| *H04N 5/265* | (2006.01) | |
| *G06V 30/142* | (2022.01) | |
| *H04N 13/00* | (2018.01) | |

(52) U.S. Cl.
CPC ............ *G06V 20/64* (2022.01); *H04N 5/265* (2013.01); *H04N 13/128* (2018.05); *H04N 13/239* (2018.05); *H04N 13/25* (2018.05); *H04N 23/68* (2023.01); *H04N 23/682* (2023.01); *H04N 23/683* (2023.01); *H04N 23/6812* (2023.01); *G06T 2207/10021* (2013.01); *G06T 2207/30201* (2013.01); *G06V 30/142* (2022.01); *H04N 2013/0081* (2013.01)

(58) Field of Classification Search
CPC ...... H04N 5/265; H04N 13/239; H04N 13/25; H04N 2013/0081; G06K 9/00; G06T 5/002; G06T 5/50; G06T 2207/10021; G06T 2207/30201; G06V 20/46; G06V 20/64; G06V 30/142
See application file for complete search history.

(56) References Cited

U.S. PATENT DOCUMENTS

| | | |
|---|---|---|
| 6,215,898 B1 | 4/2001 | Woodfill et al. |
| 6,714,665 B1 * | 3/2004 | Hanna .................... G06V 40/19 382/209 |
| 7,512,262 B2 | 3/2009 | Criminisi et al. |
| 7,557,832 B2 | 7/2009 | Lindenstruth et al. |
| 7,970,229 B2 | 6/2011 | Connell et al. |
| 8,335,350 B2 | 12/2012 | Wu |
| 8,384,787 B2 | 2/2013 | Wu |
| 8,446,468 B1 | 5/2013 | Medioni et al. |
| 8,639,024 B2 | 1/2014 | Woodfill et al. |
| 8,649,592 B2 | 2/2014 | Nguyen et al. |
| 8,891,625 B2 | 11/2014 | Chen et al. |
| 8,964,298 B2 | 2/2015 | Haddick et al. |
| 9,538,081 B1 | 1/2017 | Zhou |
| 9,661,307 B1 | 5/2017 | Mukherjee et al. |
| 2002/0061131 A1 | 5/2002 | Sawhney et al. |
| 2007/0110298 A1 | 5/2007 | Graepel et al. |
| 2009/0161827 A1 * | 6/2009 | Gertner ................ A61N 5/1017 378/65 |
| 2010/0053347 A1 | 3/2010 | Agarwala et al. |
| 2011/0026764 A1 | 2/2011 | Wang |
| 2011/0090311 A1 * | 4/2011 | Fang .................... H04N 13/286 348/43 |
| 2011/0134329 A1 | 6/2011 | Chen et al. |
| 2011/0175907 A1 | 7/2011 | Tokuda |
| 2011/0261050 A1 | 10/2011 | Smolic et al. |
| 2011/0285826 A1 | 11/2011 | Bickerstaff et al. |
| 2012/0019613 A1 | 1/2012 | Murray et al. |
| 2012/0019614 A1 | 1/2012 | Murray et al. |
| 2012/0051624 A1 | 3/2012 | Ando |
| 2012/0176380 A1 | 7/2012 | Wang et al. |
| 2012/0206573 A1 | 8/2012 | Dokor et al. |
| 2012/0219174 A1 | 8/2012 | Wu |
| 2012/0242794 A1 * | 9/2012 | Park ..................... H04N 13/264 348/46 |
| 2012/0249746 A1 * | 10/2012 | Cornog ..................... G06T 7/97 348/46 |
| 2012/0250980 A1 | 10/2012 | Gillard et al. |
| 2012/0254369 A1 | 10/2012 | Gillard et al. |
| 2013/0039568 A1 | 2/2013 | Futawatari |
| 2013/0100114 A1 * | 4/2013 | Lynch ..................... G06T 11/00 345/419 |
| 2013/0106837 A1 | 5/2013 | Mukherjee et al. |
| 2013/0107066 A1 | 5/2013 | Venkatraman et al. |
| 2013/0127844 A1 | 5/2013 | Koeppel et al. |
| 2013/0127993 A1 | 5/2013 | Wang |
| 2013/0129193 A1 | 5/2013 | Wang |
| 2013/0148944 A1 * | 6/2013 | Ando .................... G11B 27/034 386/278 |
| 2013/0183023 A1 | 7/2013 | Sandrew et al. |
| 2013/0242065 A1 | 9/2013 | Koyama et al. |
| 2013/0307937 A1 | 11/2013 | Kim |
| 2013/0321404 A1 * | 12/2013 | Chou ..................... G06F 3/0304 345/419 |
| 2014/0071236 A1 | 3/2014 | Tsukagoshi |
| 2014/0240469 A1 * | 8/2014 | Lee ........................ G01C 11/14 348/48 |
| 2014/0241614 A1 * | 8/2014 | Lee ........................ H04N 13/254 382/154 |

\* cited by examiner

DEPTH-BASED IMAGE STABILIZATION

CROSS-REFERENCES TO RELATED APPLICATIONS

This application is a continuation of U.S. application Ser. No. 16/595,423, filed Oct. 7, 2019, which is a continuation of U.S. application Ser. No. 15/396,790, filed on Jan. 2, 2017, now U.S. Pat. No. 10,440,347, which is a continuation of U.S. application Ser. No. 13/829,614, filed on Mar. 14, 2013, now U.S. Pat. No. 9,538,081, the contents of which are incorporated herein by reference.

BACKGROUND

People are increasingly utilizing portable computing devices to perform various types of tasks. As an example, people are increasingly using devices such as portable phones and tablets to take pictures, in lieu of having to carry a separate, dedicated camera. In addition to still image capture, users are also using these devices to capture video images. Oftentimes, however, it is difficult for a user to hold such a device perfectly still, which can result in shaking or movement of objects as represented in the video. While image stabilization techniques exist that can remove at least some of this movement, using these techniques on devices with high resolution cameras can require a significant amount of processing power, and be a significant drain on battery power. Other approaches attempt various hardware solutions, but this can result in complex hardware that can be expensive and unreliable. Similarly, the movement can cause blur in still images captured by these devices, resulting in users having to attempt to recapture the image, if possible and if noticed by the user in time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to image stabilization, blur reduction, and other such processes. In particular, approaches in accordance with various embodiments attempt to identify one or more foreground objects based on one or more sources of distance information, and analyze the portions of the images (including frames or portions of video) corresponding to the foreground object(s) to attempt to remove jitter, blur, or other such artifacts from the representation of the object(s) in the images. In at least some embodiments, a computing device with at least two cameras having at least partially overlapping fields of view can attempt to perform stereo imaging, where differences in disparity information can help to determine which portion(s) of the images correspond to objects that are closer to the cameras than other objects. Similar distance information can be obtained using various types of device sensors as well, as may include ultrasonic sensors for enabling time-of-flight measurements, infrared sensors providing for infrared flash intensity analysis, and other such relevant distance-determining techniques. Once a foreground object has been located, portions of the image can be designated and/or considered as foreground and background regions, and the foreground region of subsequent images and/or adjacent frames of video can be analyzed, reducing processing capacity needed for stabilization. Further, the image position can be adjusted based upon offsets in that foreground object between images or framers, for example, such that jitter or other small movements (likely due to small movements of the camera) can be minimized, and the stabilization process can focus stabilization on one or more points or features of the foreground object. Similarly, the foreground object determination can be used to select an image, from a plurality of images captured at substantially the same time, where the selected image has the least amount of blur with respect to the foreground object.

Various other applications, processes, and uses are presented below with respect to the various embodiments.

Figure 1A:
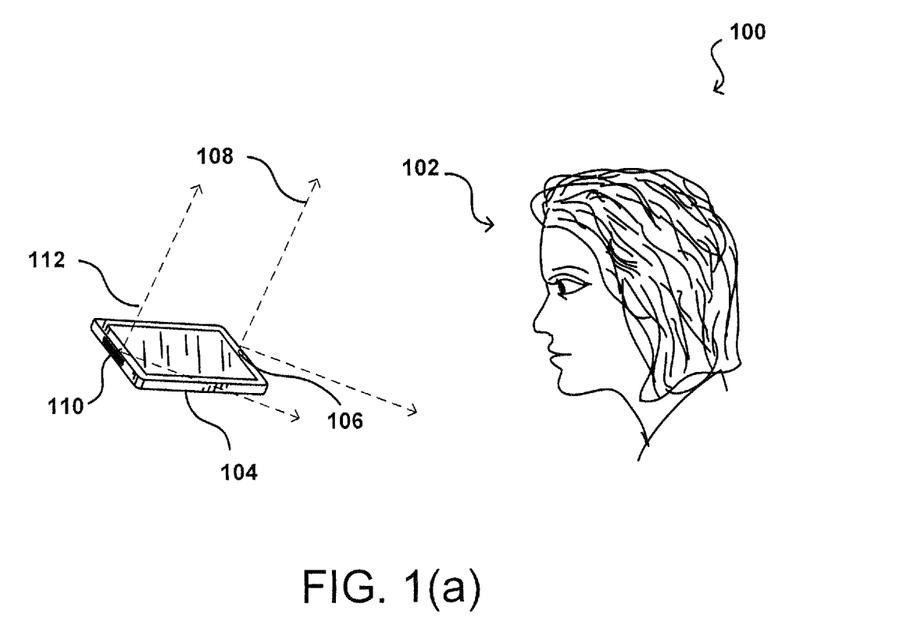
FIGS. 1(a) and 1(b) illustrate an example of a user capturing a blurry image using a portable computing device.

FIG. 1(a) illustrates an example situation 100 wherein a user 102 is attempting to provide capture video using one or more cameras of a computing device 104. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. Further, while the cameras in this example are "front-facing" cameras, as may be used for purpose such as video conferencing, it should be understood that "rear-facing" cameras or cameras in other locations or orientations can be used as well within the scope of the various embodiments.

Figure 1B:
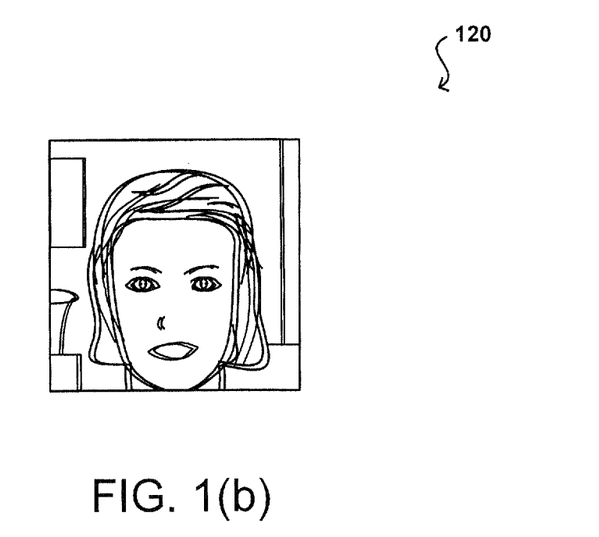

In this example, the computing device includes a pair of matched cameras 106, 110 having substantially overlapping fields of view 108, 112 and having parallel optical axes in order to enable stereo image capture. It should be understood, however, that a single camera could be used to capture images and/or video as well within the scope of the various embodiments. Each camera in the stereo imaging example will capture an image of the user 102 from a slightly different position, which will result in the user appearing in a slightly different position in each image. This offset is often referred to as the amount of "disparity" between the images. When the images are combined, a stereo image 120 such as that illustrated in FIG. 1(b) can be rendered, which can utilize stereoscopic glasses or other such technology to cause each of the user's eye to see a different portion of each image, causing objects in the image to appear to be at different depths, a function of their relative amounts of disparity. As illustrated in FIG. 1(b), there is a greater amount of disparity, or offset, of the location of the user between the two images than of objects in the background. This difference can be utilized advantageously as discussed later herein.

Figure 2:
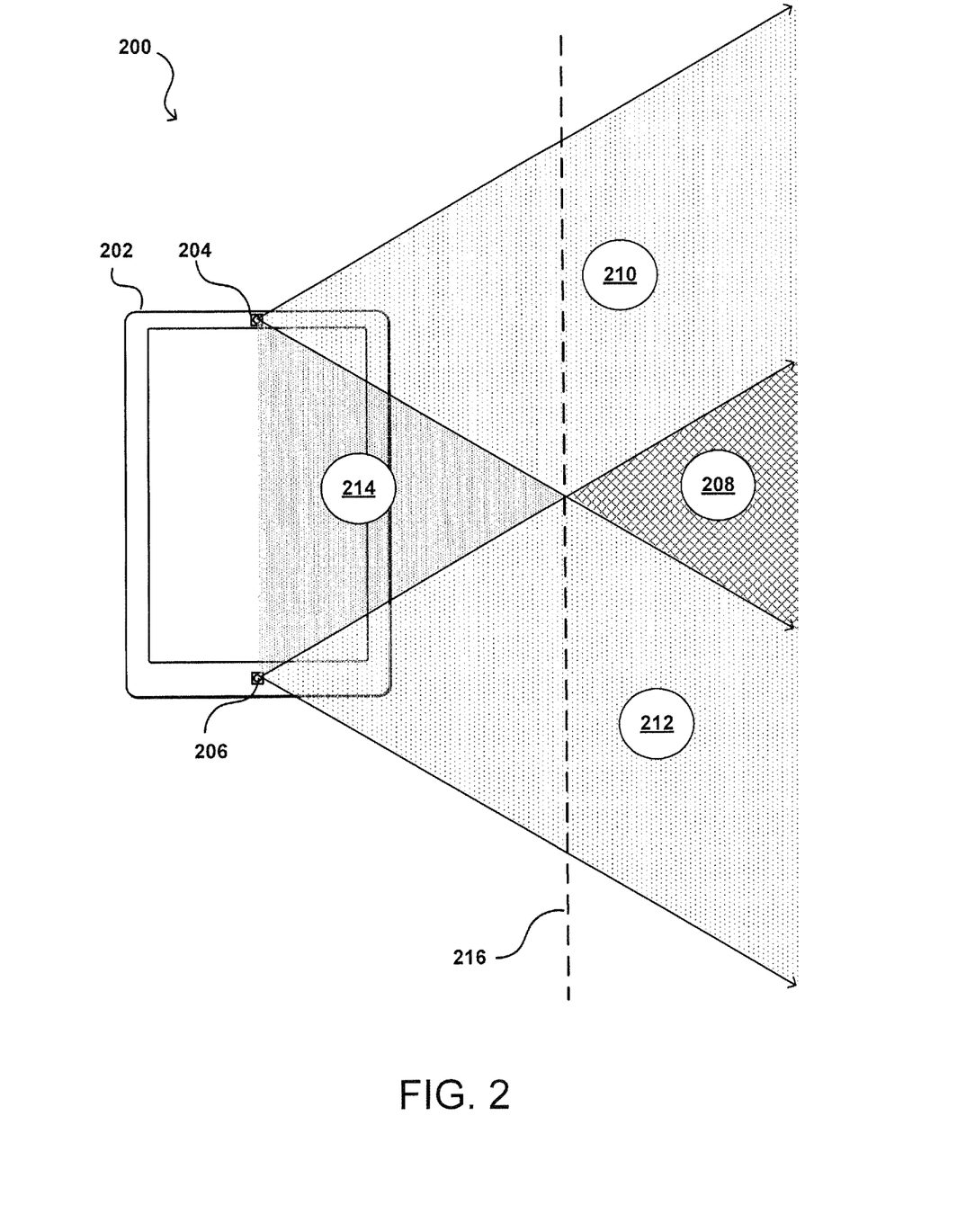
FIG. 2 illustrates example regions viewable by a pair of cameras that can be used in accordance with various embodiments.

As mentioned, stereo imaging can be used to build a disparity map of the objects in the stereo images. In order for the disparity to be determined for an object, however, that object has to be visible in the image captured by each of the cameras. For example, FIG. 2 illustrates an example situation 200 where a pair of matched cameras 204, 206 of a computing device 202 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 208 or region that is a distance from the device 202. Using conventional stereo imaging approaches, anything closer to the device than this overlap zone 208 will not be able to have disparity information determined, as the object would be seen by at most one of the cameras. An object in a zone 214 close to the device and between the cameras 204, 206 will not be seen by either camera and thus cannot be included in the disparity information (unless estimated from previous measurements and motion tracking, for example). There are two zones 210, 212 where an object can only be seen by one of the cameras 204, 206. Again, disparity information cannot be calculated for items in either of these zones. The effect of these zones decreases with distance, such that past a certain distance (e.g., a meter or so for certain devices) the fields of view of the cameras substantially overlap. For objects within the zone 208 viewable by both cameras 204, 206, the relative disparities can be indicative of distances from the camera, even if actual distances are not calculated. Thus, for objects having disparities that differ by more than a minimum threshold, for example, it can be possible to designate one of the objects as being in front of the other. For objects that have more than a specified threshold difference in disparity, for example, those objects can be designated as being in different planes or regions, such as a foreground, midground, and background, among others.

Figure 3A:
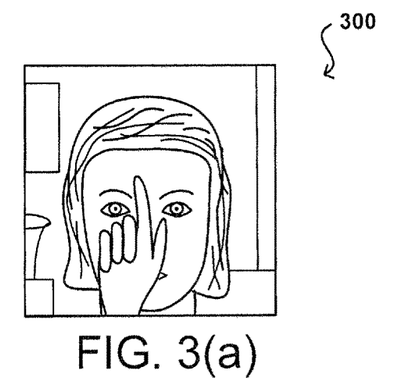
FIGS. 3(a), 3(b), 3(c), and 3(d) illustrate disparity information that can be leveraged in accordance with various embodiments.
Figure 3B:
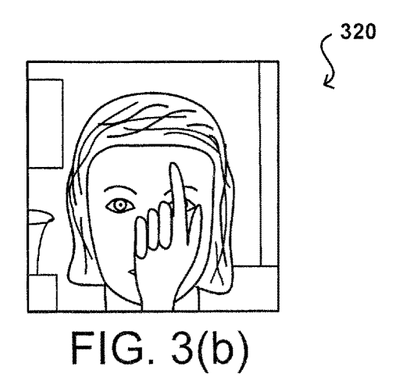
Figure 3C:
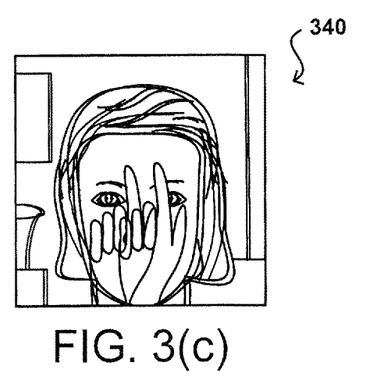

As an example, FIGS. 3(a) and 3(b) illustrate images 300, 320 that could be captured using stereo cameras. As can be seen, objects are slightly offset in one image with respect to the other. FIG. 3(c) illustrates an example combination image 340 highlighting the relative position and/or relative difference in disparity of those objects in the captured images 300, 320. As illustrated, objects closest to the camera, such as the user's face or head 322, have the greatest amount of disparity, or offset between images. Objects in the background, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

Figure 3D:
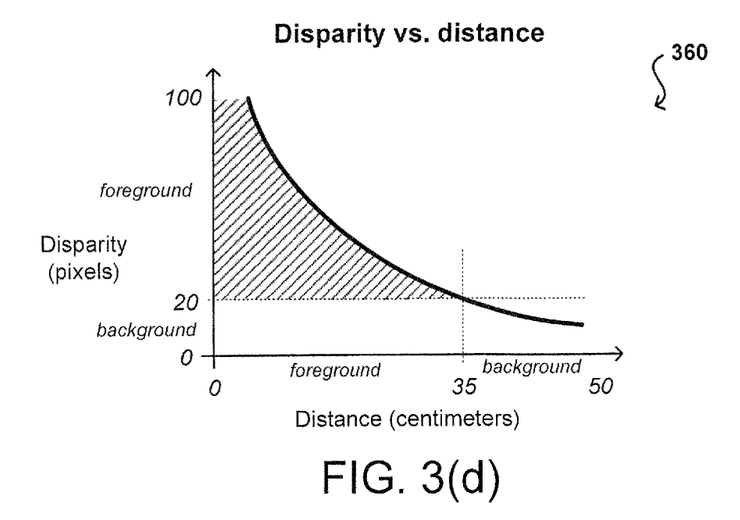

FIG. 3(d) illustrates an example plot 300 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can select a distance past which objects are to be considered background objects, which can correspond to a small number of disparity levels to be analyzed. For example, a user providing motion input for a virtual keyboard of a smart phone might typically provide input within thirty-five centimeters of the device. Accordingly, the device for that application might set a threshold of thirty-five centimeters for background separation. By examining the disparity relationship curve 360 or relationship, the device (or an application or user of the device) can determine that the amount of disparity at thirty-five centimeters for the configuration parameters of the current device (e.g., camera resolution, camera separation, field of view, etc.) is twenty pixels of separation between images. Using this information, the device can analyze objects in the stereo images, and any objects having twenty pixels of disparity or less can be removed from the images as background images. Any remaining images can be left in the images as foreground images. As illustrated in the FIG. 3(d), the fewer levels of disparity for the background objects can significantly reduce that the amount of processing of the image that is needed. Although likely more processor intensive, and likely to exclude features seen only by a single camera, another approach would be to select portions of the image that have more than the threshold amount of disparity as foreground images. Various other such approaches can be used as well.

In one example, an application can designate that anything within one meter of the device should be determined to be a foreground object. In another embodiment, an application can determine the distance to a feature of the user and make some factor of that distance, such as 1.25×, the distance cutoff. The actual value of the disparity threshold then can be calculated using that designation with information about the computing device capturing the image information. For example, the amount of disparity, D, at a given distance, d, can be given by:

$$D = \frac{f \times B}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. For any object in the images that has a disparity of less than twenty pixels, that object can be considered a background object and removed from consideration for image stabilization purposes.

Figure 4A:
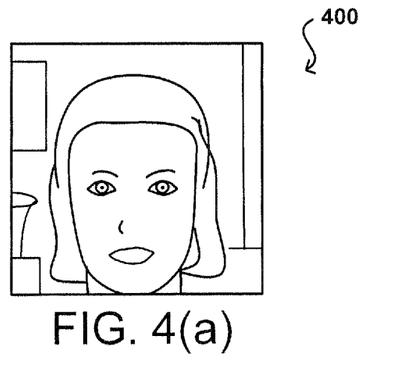
FIGS. 4(a), 4(b), 4(c), 4(d), 4(e), and 4(f) illustrate example images that can be analyzed and/or produced in accordance with various embodiments.
Figure 4B:
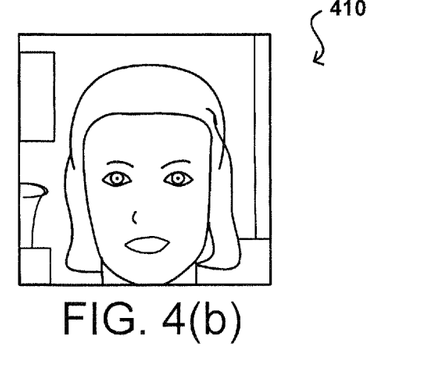
Figure 4C:
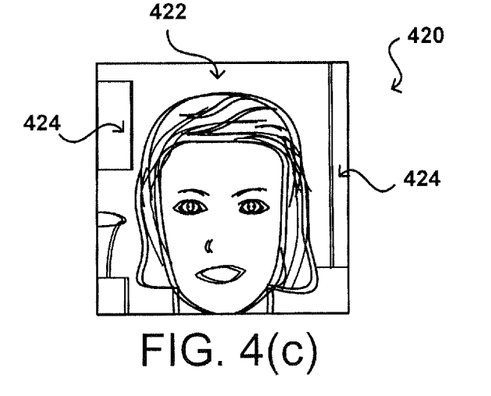
Figure 4D:
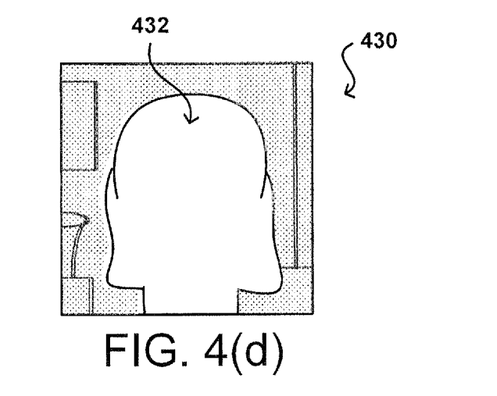

Systems and methods in accordance with various embodiments can take advantage of the relationship between disparity and distance to objects in the foreground from objects in the background of an image (or pair of images, video, etc.) without the need to generate a full disparity map or otherwise fully process both images. FIGS. 4(a) through 4(d) further illustrate changes in disparity with distance. As with FIG. 3, FIGS. 4(a) through 4(c) illustrate left 400 and right 410 images that, when combined, show greater amounts of disparity for objects in the foreground, such as the user's hand, than objects in the background. Once the foreground object has been identified, an approximate region 432 or location of that object can be identified, such as is represented in FIG. 4(d). This region can be represented by a shape, a bounding box, a set of feature points, and the like. The region might also be extended to cover a portion of the image outside the object, to allow for some amount of movement or jitter that can occur while still causing the foreground object to appear in that region in the next image or frame of video. In at least some embodiments, feature points for the object can be determined as is known for object tracking, and those features can be used to attempt to locate the object in subsequent images. The ability to designate portions of the image as foreground and background regions, and narrow the search to the portion of the image substantially corresponding to the location of the foreground object in the previous image, can help to reduce the amount of processing needed to locate the object.

Figure 4E:
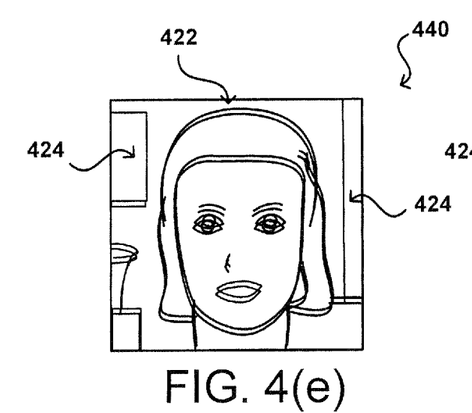
Figure 4F:
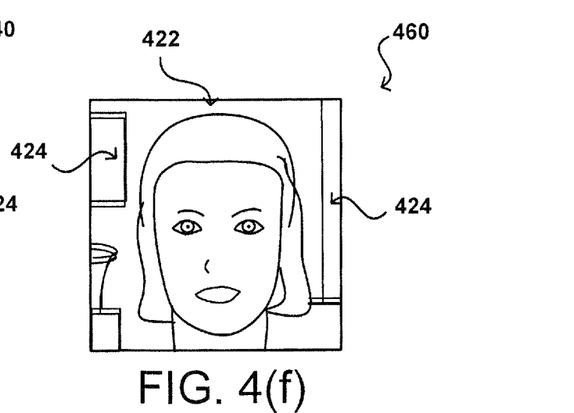

FIG. 4(e) illustrates an illustration 440 wherein a subsequently captured image is overlaid upon one of the previously captured images. As can be seen, there was a slight primarily vertical offset of objects between the two images, such as may be due to slight movements of the device being held by the user. As a result of having identified the foreground object in the first image, the computing device (or a system or service in communication with the device) can locate the object in the second image, determine the amount of offset, and then adjust the rendering and/or display of the second image, or other such information, in order to account for, or remove, the offset in order to cause the location of the foreground object, here the user's head, to remain in substantially the same location even though the position of the camera changes between times of image capture. FIG. 4(f) illustrates an example illustration 440 of an overlay of those two images after accounting for the offset. As can be seen, the position of the user's head 422 between images or frames, at least as displayed, does not appear to change. It should be understood that the apparent movement of objects due to camera movement can differ based at least in part upon the distance of the objects from the camera, so there might still be some offset or movement of objects in the background, as illustrated in the example 460 of FIG. 4(f). In most cases, however, a user is most interested in focusing on the foreground object(s) and is willing to tolerate an amount of movement, jitter, blur, or noise in the background objects. In at least some embodiments, however, a user can have the ability to deactivate or change the way image stabilization is performed, or even select other objects in the image view to be used for stabilization.

As discussed, however, stereo imaging might not be available on all devices, or may not be sufficient for all conditions. For example, stereo imaging typically requires a minimum amount of contrast in order to be able to correlate the objects in the images captured from each camera. Accordingly, approaches in accordance with various embodiments can utilize different approaches, and/or a combination of approaches, to provide distance determinations useful in separating foreground objects from background objects. For example, a computing device might use a light sensor or other such component to determine an amount of light and/or image contrast near the computing device. If a sufficient amount of contrast is present, the device can utilize a stereo imaging approach. If there is not a sufficient amount of contrast, however, the device can attempt to use an alternative (or additional) approach to making distance determinations. If stereo imaging is not available, the device might instead rely on such an approach.

For example, a device can utilize infrared radiation (IR) to attempt to separate foreground objects from background objects in at least some embodiments, where the device can capture one image while emitting IR radiation and another image without IR radiation. Objects in the foreground will show stronger differences as a result of the illumination between figures, which can facilitate the identification of foreground objects. In other embodiments, a single image can be captured and the relative brightness of objects used to separate objects into foreground and background objects or regions, although a single image may not be as reliable as intensity differences can also vary based on color, surface texture, reflectivity, and other such factors. Multi-image based IR-based approaches can suffer from motion effects, however, as the images are captured at different points in time. Stereo imaging captures image information at the same time, such that there is little to no effect due to motion, other than blur or other such effects. IR-based approaches can produce relatively crisp images, even when there is an amount of motion, but do not work well in bright sunlight, where stereo imaging tends to perform well. IR-based approaches work well up to thirty centimeters, for example, but stereo approaches work for longer distances, such as up to three meters, but have blind zones when very close to the device. Stereo and IR based approaches thus complement each other, and can be used together advantageously in at least some embodiments for at least a certain range of conditions. Thus, a device can attempt to determine one or more environmental conditions, such as an amount of light or motion, and can select to use a stereo based approach or an IR based approach, or a combination of both. An advantage to using a combination of approaches is that each individual approach might only give a result with 80% confidence, but using them together can result in a confidence of about 96 percent in at least some embodiments.

In at least some embodiments, an ultrasonic sensor or other distance determining sensor can be used to attempt to determine relative distances to objects represented in an image. Using such an approach, the differences in time-of-flight, as known for distance determinations, can be used to determine relative, if not absolute, differences in distance. Such approaches can also be used to determine or identify foreground objects. Various other distance determining approaches can be utilized as well within the scope of the various embodiments.

In some embodiments, a computing device might utilize one or more motion sensors, such as an electronic gyroscope or inertial sensor, to attempt to assist with location determinations. For example, a rotation of a device can cause a rapid shift in objects represented in an image, such that image stabilization might not be attempted if the amount of motion exceeds a determined amount. For smaller movements, the information from the motion sensors can be used to provide a starting point for the feature detection in a subsequent image, which can increase the speed of the detection process and reduce the amount of processing and power required. Various other types of movement or motion information can be used as well within the scope of the various embodiments.

Figure 5:
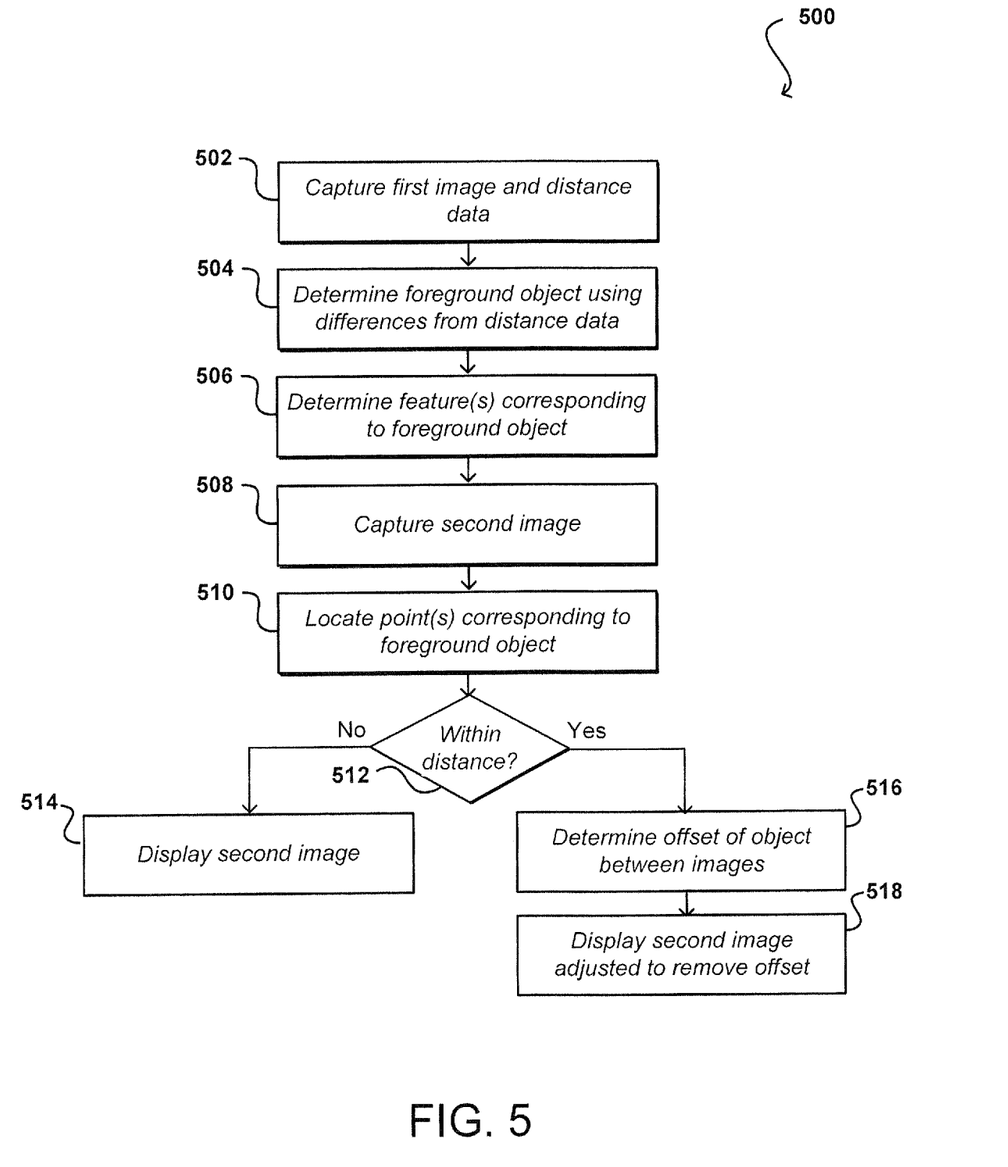
FIG. 5 illustrates an example process for removing jitter from captured video that can be used in accordance with various embodiments.

FIG. 5 illustrates an example process 500 for stabilizing a foreground object as represented in video data that can be used in accordance with various embodiments. It should be understood that, for any process discussed herein, there can be additional, fewer, or alternative steps performed in similar or alternative orders, or in parallel, within the scope of the various embodiments unless otherwise stated. In this example, at least a first image is captured 502 along with distance data. As discussed, the distance data can be obtained by capturing a second image from a stereoscopic pair and using differences in disparity to separate objects into at least foreground and background objects. In other embodiments, ultrasonic sensors, infrared intensity differences, or other mechanisms can be used, as discussed elsewhere herein, to determine at least relative differences in distance between two or more objects represented in at least the first image. Once the distance information is obtained, one or more foreground objects can be determined 504 using the difference in distance data, along with general segmentation algorithms or other such approaches. As discussed, this can include separating objects into regions of distance when those objects differ by at least a specified distance or amount of disparity, etc. Once a foreground object is identified, one or more features of that foreground object can be determined 506, such as by determining a shape, bounding box, or center point (e.g., a centroid), or identifying a plurality of feature points representative of the object. The extent of the foreground object can be identified, in at least some embodiments, using edge data, gradient-based information, or color information, among other such options. The information about the foreground object then can be stored, either in resident memory or persistent storage, among other such options.

Subsequently, a second image can be captured 508, where that second image can comprise a separate frame or portion of video data. At least a portion of the second image can be analyzed to attempt to locate 510 the point(s) corresponding to the identified foreground object(s). As discussed, these can include shapes, feature points, contours, or any other features or aspects useful for identifying an object in an image. Also as discussed, information from the previous image can be used to attempt to narrow a search region in the second image. Once the point(s) for the foreground object are located in the second image, a determination can be made 512 as to whether the points moved by less than a determined distance or amount, such as a percentage of the screen or number of pixels. As discussed, a certain amount of movement (e.g., a stabilization threshold) can be attributed to potential camera shake or other such causes, while movements beyond that amount can be determined to be intentional movements that should not be removed from the video. If the movement or offset is more than the stabilization threshold value, for example, the second image can be displayed 514 without offset adjustment. If the movement or offset is less than the stabilization threshold, and appreciably more than zero movement in at least some embodiments, the offset for the foreground object between the two images can be determined 516. The second image can then be displayed 518 in a manner that accounts for the offset, such as by shifting the image by an equal amount in the opposite direction such that the foreground object does not appear to move in the video. In order to accomplish this, in at least some embodiments the image displayed is less than the image captured, by at least twice the stabilization threshold amount, such that the image can be zoomed and then shifted by up to the stabilization threshold in any direction. In embodiments where the video is not displayed immediately or the stabilization is performed on the video file itself, a similar approach can be used to adjust the portion of the video data stored in the video file such that, upon playback, the foreground object does not appear to move when that motion would be less than the stabilization threshold.

Figure 6A:
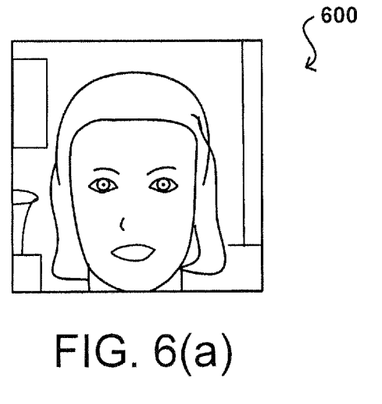
FIGS. 6(a), 6(b), 6(c), 6(d), and 6(e) illustrate example images that can be analyzed and/or produced in accordance with various embodiments.
Figure 6B:
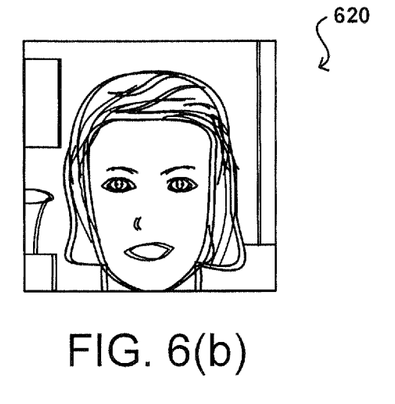
Figure 6C:
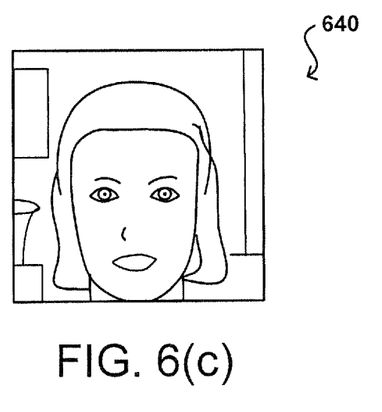

Being able to identify foreground objects based at least in part upon differences in distance can also be utilized to assist with blur reduction for still images. For example, a user might press a button or otherwise cause a camera on a computing device to capture an image. In at least some embodiments, the camera can be configured to capture a set of images in rapid succession in response to the activation. Examples of such images 600, 620, 640 are illustrated in FIGS. 6(a), 6(b), and 6(c). In FIGS. 6(a) and 6(c), the foreground object is not particularly blurry, but in FIG. 6(b) the foreground object is blurry due to factors such as slight movement of the camera in response to the user holding the device and/or pressing the capture button. If a single image was to be captured, and that image had a blurry foreground object, the user would have to first display the image, see that the image was blurry (which can be difficult to determine on a relatively small display of a portable device), and attempt to capture another image that is less blurry. For images of certain actions or events, another attempt to capture the image might not be possible. By instead capturing a series of images, the computing device (or a system or service in communication with the device) can attempt to determine a foreground object that is likely of interest, using approaches such as those discussed and suggested herein, and then select an image of the series that has the least amount of blur of the foreground object, or at least less than an allowable amount of blur, among other such options.

Figure 6D:
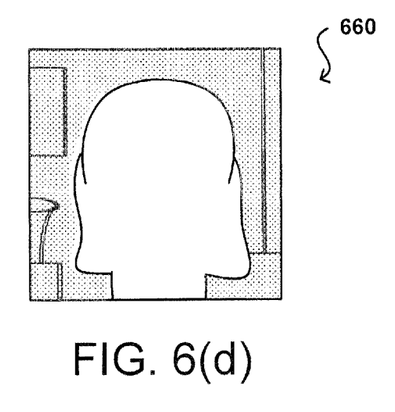
Figure 6E:
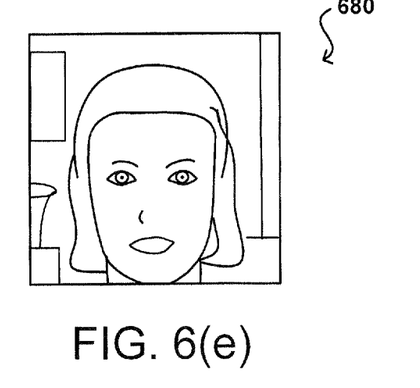

As an example, FIG. 6(d) illustrates an example situation 660 where the computing device has utilized disparity and/or distance information to identify a foreground object. In this example, the foreground object is illustrated in white with the background being grayed out for demonstration. The device then can identify points, contours, or other features of the foreground object as discussed herein to attempt to locate that same object in the other images. The regions corresponding to that object then can be analyzed for at least some of those images to attempt to determine an amount of blur. Any appropriate blur determination approaches can be used within the scope of the various embodiments, as may include Canny edge detection, Hough transform analysis, histogram analysis, or wavelet transform, among other such options. When an image is found that has at most an allowable amount of blur, or an image is determined to have the least amount of blur out or the series, for the foreground object, that image 680 can be selected as the image corresponding to the user action, which as illustrated in FIG. 6(e) has very little blur of the foreground object. The user can have the option of specifying a different object as the focus of the image, or otherwise overriding the selection process.

Figure 7:
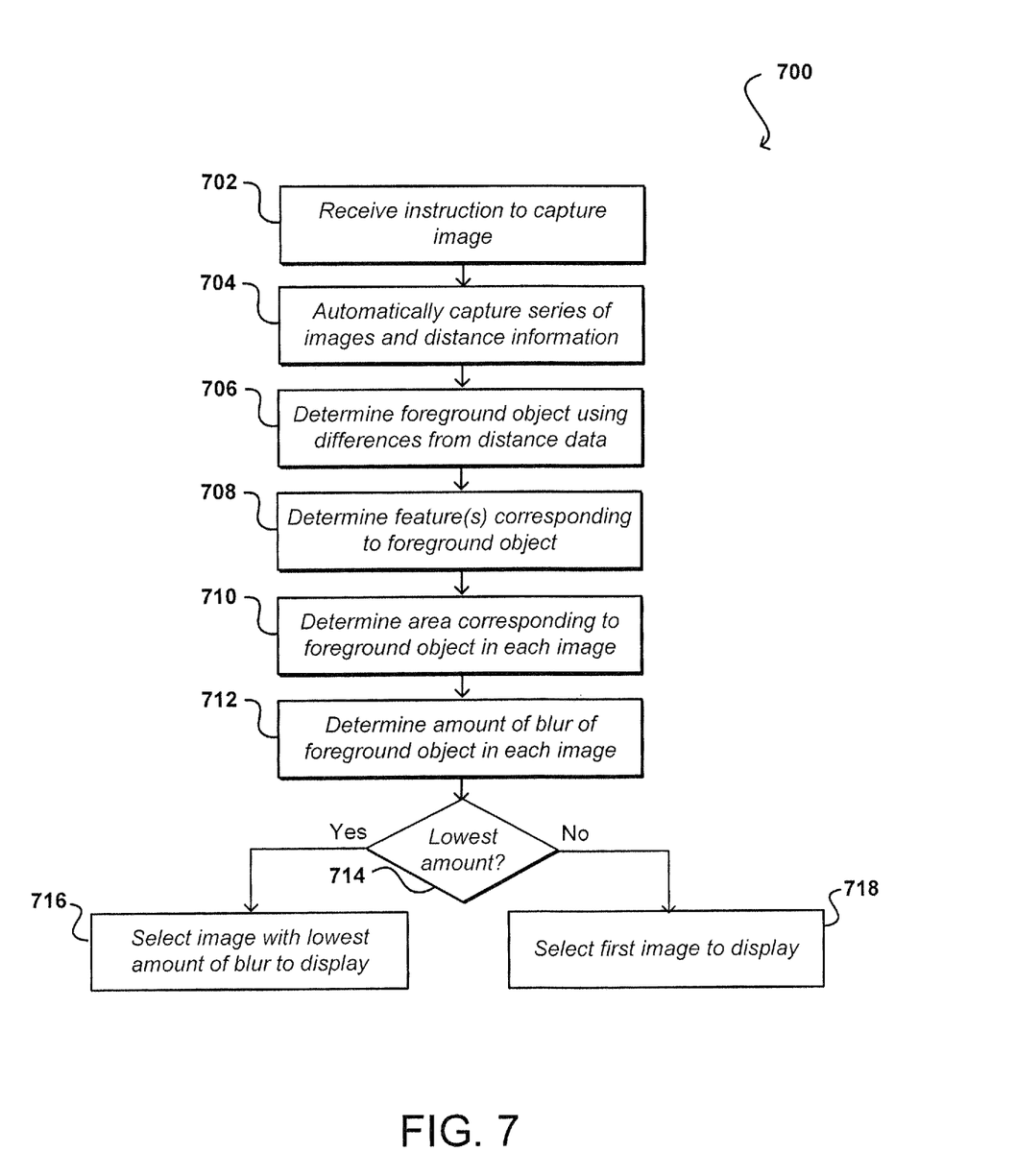
FIG. 7 illustrates an example process for producing an image with minimal blur of a foreground object that can be used in accordance with various embodiments.

FIG. 7 illustrates an example process 700 for minimizing blur of a foreground object of an image that can be used in accordance with various embodiments. In this example, an instruction (or request, etc.) to capture an image is received 702, such as may be in response to a user selecting a capture button or element on a computing device. In response to the instruction, a series of images can be automatically captured 704 in relatively rapid succession (e.g., at the maximum frame rate of the camera). Along with the series of images, distance and/or depth information can also be obtained. As discussed, this can include capturing stereo images and using disparity information to identify foreground objects, or can include using a type of distance sensor to separate objects or portions of the image by relative distance from the device. Using the distance information, a foreground object can be identified 706 in at least one of the images, and points, contours, or other features identified 708 for the foreground object. The approximate area of the foreground object 710 can also be determined in this example. Based at least in part upon the approximate area and/or the features of the foreground object, the foreground object can be identified in one or more of the images and the amount of blur determined 712 for that foreground object in each of the images analyzed. If all the images are analyzed, a determination can be made 714 as to whether one of the images has less blur than the others with respect to the foreground object. If so, that image can be selected 716 for display and/or storage in response to the received instruction. If not, an appropriate one of the images can be selected 718, such as the first image in the series (which is closer to the timing of the instruction and thus most likely to represent that in which the user was interested) or the image currently stored in resident memory, among other such options. As discussed, in some embodiments an image can be selected as soon as an image is located that has less than an allowable amount of blur, in order to reduce processing and power requirements as well as to reduce the latency of the image capture process.

In a series of images where the blur was sufficiently small in at least a number of images but there might have been a small amount of motion, an offset compensation approach can be used as discussed above to attempt to align the foreground object in the images with allowable amounts of blur. These images then can be merged (e.g., averaging pixel values for similar points in each image) and/or otherwise processed to attempt to provide an improved image, which can result in a lower overall amount of blur in the resulting combination image, with the combination image being selected as the image for the instruction. Any appropriate image combining approach can be used as known in the art for purposes such as reducing noise or blur, as may include image stacking and/or merge approaches, pixel blending approaches, pixel mean determinations, and the like.

In at least some embodiments, an object must exhibit one or more other properties than being closest to the camera in order to be selected as a foreground object. For example, the object might have to be within a specified distance range, such as a range that is not too close to the camera or too far from the camera. If an object is detected that is less than a foot away from a camera, for example, and thus would not be able to be brought into focus for some cameras, that object might not be selected as an intended foreground object. Similarly, if the object is far enough away that the disparity will not be appreciably different from the background images, that object might not be selected as a foreground image. The object might also potentially have to be in or near a central region of the image. Such placement indicates that the object is likely of interest to the user, and prevents the identification of things like branches or furniture near the edges of the image from being identified as objects to be used for focusing or blur reduction. Other information might be used as well, such as the need to identify or recognize a face or head for certain applications in order to identify an object as a foreground object.

In some embodiments, the distance information or image segmentation data can also be used to stabilize video in three dimensions. For example, a zoom or crop feature can be used to adjust for variations of depth of a foreground object. As the differences in distance are determined, a zoom or crop level can be adjusted such that the apparent size of the foreground object does not change even though the distance to the object is changing, resulting in small variations in size.

Figure 8:
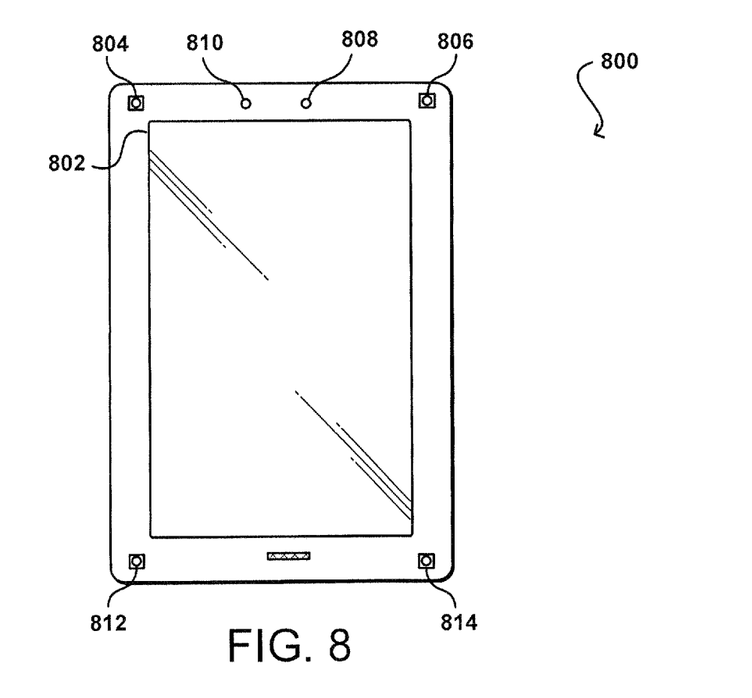
FIG. 8 illustrates an example computing device that can be used in accordance with various embodiments.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 808 is included that can be used to determine an amount of light in a general direction of objects to be captured and at least one illumination element 810, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 9:
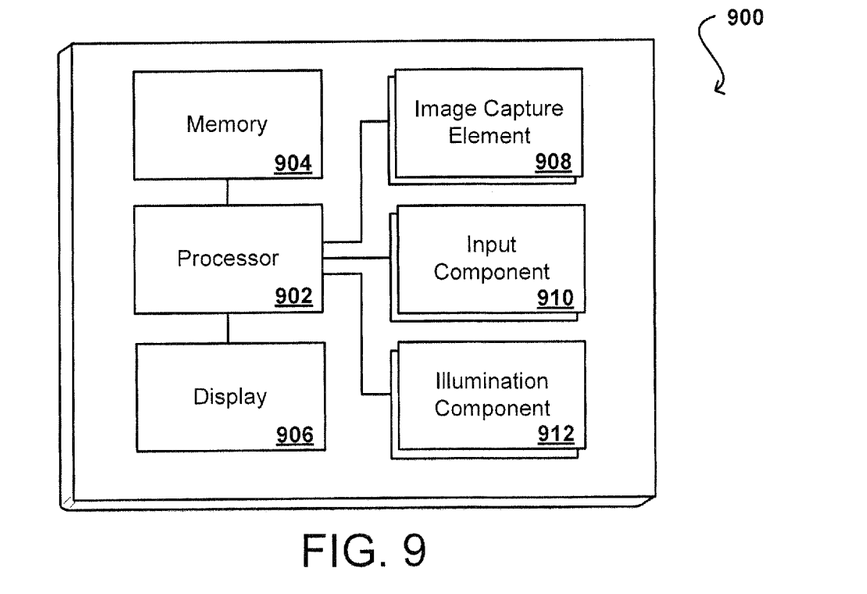
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 910, such as an electronic gyroscope used to determine motion of the device for assistance in input determination. The device also can include at least one illumination element 912, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
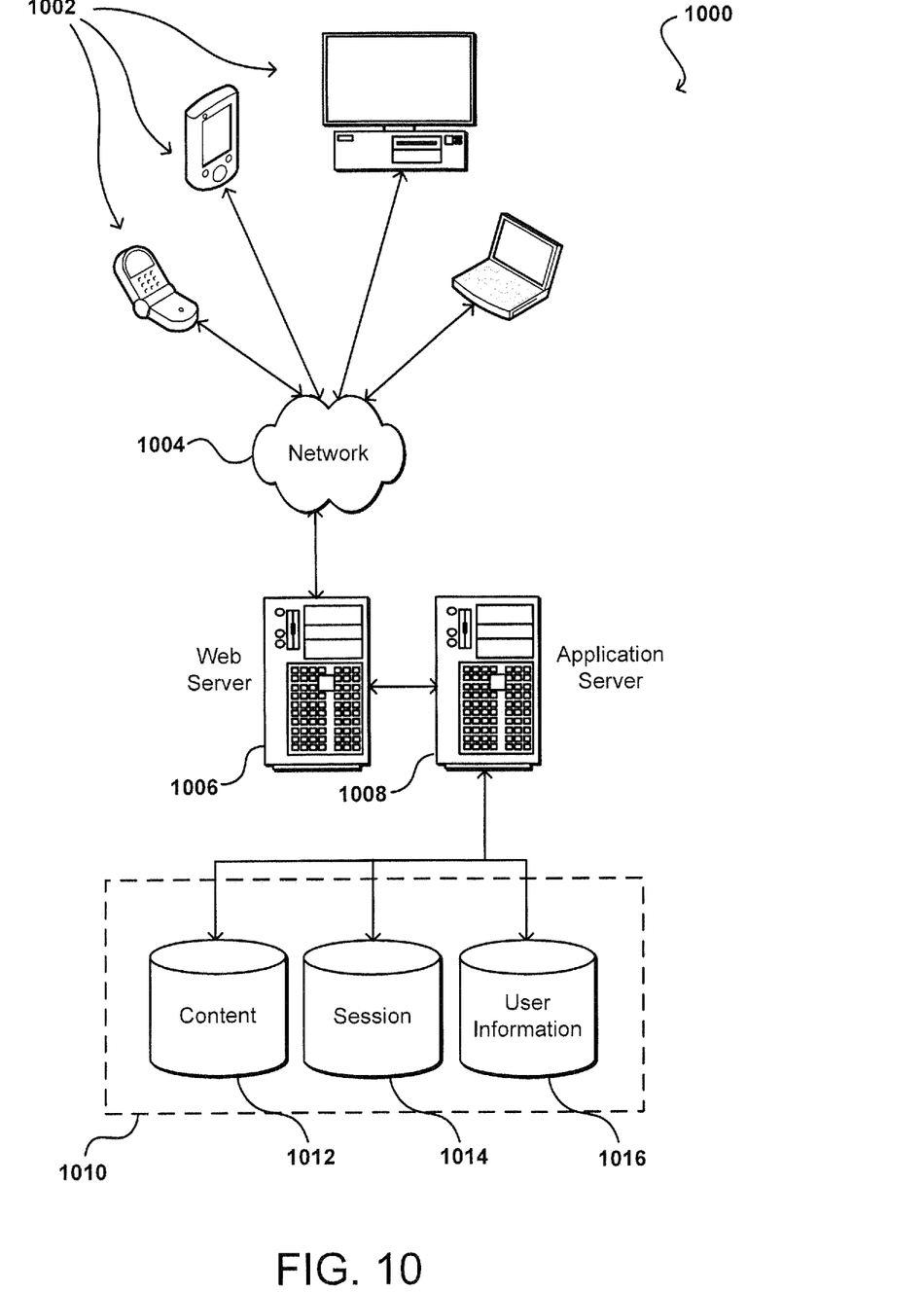
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, UDP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting motion information of a computing device using a motion sensor of the computing device;
   in response to detecting the motion information, determining first depth information of an object represented in first image data captured by one or more infrared image sensors of a computing device;
   determining a first plurality of facial feature points of the object represented in the first image data;
   using the first depth information of the object to narrow an analysis region in second image data captured by the one or more infrared image sensors;
   determining a second plurality of facial feature points of the object represented in the second image data;
   determining one or more amounts of differences between the first plurality of facial feature points and the second plurality of facial feature points; and
   analyzing the one or more amounts of differences with respect to a threshold.

2. The computer-implemented method of claim 1, further comprising:
   storing, in persistent storage of the computing device, the first plurality of facial feature points.

3. The computer-implemented method of claim 1, further comprising:
   determining an amount of ambient light illuminating the object represented in the first image data; and determining an amount of infrared light to emit based on the amount of ambient light.

4. The computer-implemented method of claim 1, further comprising:
determining a plurality of segments of the object represented in the first image data based at least in part on the first depth information.

5. The computer-implemented method of claim 1, further comprising:
capturing a series of images using the one or more infrared image sensors; and
selecting the first image data from the series of images based at least on motion sensor data.

6. The computer-implemented method of claim 1, further comprising:
determining that the first image data includes foreground and background objects based at least on the first depth information; and
determining the first plurality of facial feature points based at least on the object being a foreground object.

7. The computer-implemented method of claim 1, further comprising:
determining that the first image data includes central objects and peripheral objects; and
determining the first plurality of facial feature points based at least on the object being a central object.

8. The computer-implemented method of claim 1, further comprising:
using the motion information as a starting point for determining the first plurality of facial feature points.

9. The computer-implemented method of claim 1, further comprising:
illuminating the object using an infrared light source; and
identifying the object as a foreground object based at least on reflected infrared intensity.

10. The computer-implemented method of claim 1, further comprising:
recognizing the object as a face.

11. A computing device, comprising:
one or more infrared image sensors;
at least one motion sensor;
one or more processors; and
memory including instructions that, when executed by the one or more processors, cause the computing device to:
detect motion information of the computing device using the at least one motion sensor;
in response to detecting the motion information, determine first depth information of an object represented in first image data captured by the one or more infrared image sensors;
determine a first plurality of facial feature points of the object represented in the first image data;
use the first depth information of the object to narrow an analysis region in second image data captured by the one or more infrared image sensors;
determine a second plurality of facial feature points of the object represented in the second image data;
determine one or more amounts of differences between the first plurality of facial feature points and the second plurality of facial feature points; and
analyze the one or more amounts of differences with respect to a threshold.

12. The computing device of claim 11, further comprising persistent storage, the instructions that, when executed by the one or more processors, further cause the computing device to store the first plurality of facial feature points in the persistent storage.

13. The computing device of claim 11, further comprising:
an ambient light detector; and
an infrared light source, the instructions that, when executed by the one or more processors, further cause the computing device to:
determine an amount of ambient light illuminating the object represented in the first image data using the ambient light detector; and
emit an amount of infrared light using the infrared light source, based on the amount of ambient light.

14. The computing device of claim 11, further comprising further instructions that, when executed by the one or more processors, further cause the computing device to determine a plurality of segments of the object represented in the first image data based at least in part on the first depth information.

15. The computing device of claim 11, further comprising a motion sensor, the instructions that, when executed by the one or more processors, further cause the computing device to:
capture a series of images using the one or more infrared image sensors; and
select the first image data from the series of images based at least on motion sensor data.

16. The computing device of claim 11, further comprising further instructions that, when executed by the one or more processors, further cause the computing device to:
determine that the first image data includes foreground and background objects based at least on the first depth information; and
determine the first plurality of facial feature points based at least on the object being a foreground object.

17. The computing device of claim 11, further comprising further instructions that, when executed by the one or more processors, further cause the computing device to:
determine that the first image data includes central objects and peripheral objects; and
determine the first plurality of facial feature points based at least on the object being a central object.

18. The computing device of claim 11, further comprising further instructions that, when executed by the one or more processors, further cause the computing device to:
use the motion information as a starting point for determining the first plurality of facial feature points.

19. The computing device of claim 11, further comprising an infrared light source, the instructions that, when executed by the one or more processors, further cause the computing device to:
illuminate the object using the infrared light source; and
identify the object as a foreground object based at least on reflected infrared intensity.

20. The computing device of claim 11, further comprising further instructions that, when executed by the one or more processors, further cause the computing device to recognize the object as a face.

* * * * *